(12) United States Patent
Jessen

(10) Patent No.: US 7,370,072 B2
(45) Date of Patent: May 6, 2008

(54) SYSTEM AND METHOD FOR COLLECTING ELECTRONIC EVIDENCE DATA

(75) Inventor: John H. Jessen, Bellevue, WA (US)

(73) Assignee: Electronic Evidence Discovery, Inc., Kirkland, WA (US)

( * ) Notice: Subject to any disclaimer, the term of this patent is extended or adjusted under 35 U.S.C. 154(b) by 641 days.

(21) Appl. No.: 10/192,683

(22) Filed: Jul. 8, 2002

(65) Prior Publication Data

US 2004/0006588 A1     Jan. 8, 2004

(51) Int. Cl.
*G06F 15/16* (2006.01)
(52) U.S. Cl. .............. 709/202; 709/217; 709/223; 709/224; 707/3
(58) Field of Classification Search ........ 709/201–203, 709/217–219, 223–224; 707/3
See application file for complete search history.

(56) References Cited

U.S. PATENT DOCUMENTS

| | | | |
|---|---|---|---|
| 5,737,727 A | 4/1998 | Lehmann et al. | |
| 5,813,009 A | 9/1998 | Johnson et al. | |
| 5,944,783 A | 8/1999 | Nieten | |
| 6,055,562 A | 4/2000 | Devarakonda et al. | |
| 6,065,040 A | 5/2000 | Mima et al. | |
| 6,078,924 A | 6/2000 | Ainsbury et al. | |
| 6,088,689 A | 7/2000 | Kohn et al. | |
| 6,151,583 A | 11/2000 | Ohmura et al. | |
| 6,151,601 A | 11/2000 | Papierniak et al. | |
| 6,175,855 B1 | 1/2001 | Reich et al. | |
| 6,233,586 B1 | 5/2001 | Chang et al. | |
| 6,233,601 B1 | 5/2001 | Walsh | |
| 6,263,342 B1 | 7/2001 | Chang et al. | |
| 6,272,488 B1 | 8/2001 | Chang et al. | |
| 6,272,528 B1 | 8/2001 | Cullen et al. | |
| 6,282,563 B1 | 8/2001 | Yamamoto et al. | |
| 6,343,311 B1 | 1/2002 | Nishida et al. | |
| 6,353,929 B1 | 3/2002 | Houston | |
| 6,370,541 B1 | 4/2002 | Chou et al. | |
| 6,418,463 B1 | 7/2002 | Blevins | |
| 6,424,968 B1 * | 7/2002 | Broster et al. ............. | 707/3 |
| 6,434,595 B1 | 8/2002 | Suzuki et al. | |
| 6,477,563 B1 | 11/2002 | Kawamura et al. | |
| 6,496,871 B1 | 12/2002 | Jagannathan et al. | |

(Continued)

OTHER PUBLICATIONS

1stlegal, Inc., <http://www.1stlegal.com/index.asp> "Home Page" [retrieved Apr. 1, 2003].

*Primary Examiner*—Saleh Najjar
*Assistant Examiner*—Faruk Hamza
(74) *Attorney, Agent, or Firm*—Christensen O'Connor Johnson Kindness PLLC

(57) ABSTRACT

A system and method for automatically locating, identifying, and collecting electronic evidence data stored in a number of computers. In one embodiment, a method of the present invention collects electronic evidence data from a plurality of computers and stores the collected data on a server. The method first provides an agent software application to the plurality of computers. The agent software application is configured and arranged with predefined criteria that allows the agent software application to identify data that is characteristic of electronic evidence. The agent software application is also configured and arranged to transmit the identified data to the server. In response to receiving the identified data, the server stores the identified data on a memory device of the server.

24 Claims, 4 Drawing Sheets

U.S. PATENT DOCUMENTS

| | | |
|---|---|---|
| 6,502,109 B1 | 12/2002 | Aravamudan et al. |
| 6,513,059 B1 | 1/2003 | Gupta et al. |
| 6,546,387 B1 * | 4/2003 | Triggs .......................... 707/5 |
| 6,609,215 B1 * | 8/2003 | Hamilton et al. ............. 714/15 |
| 6,633,977 B1 * | 10/2003 | Hamilton et al. ........... 713/100 |
| 6,694,307 B2 * | 2/2004 | Julien ............................ 707/3 |
| 6,725,425 B1 * | 4/2004 | Rajan et al. ................. 715/513 |
| 6,738,760 B1 * | 5/2004 | Krachman ...................... 707/3 |
| 6,785,834 B2 * | 8/2004 | Chefalas et al. ................ 714/4 |
| 6,944,790 B2 * | 9/2005 | Hamilton et al. ............... 714/6 |

* cited by examiner

SYSTEM AND METHOD FOR COLLECTING ELECTRONIC EVIDENCE DATA

FIELD OF THE INVENTION

The present invention generally relates to computer systems, and in particular, the present invention relates to a method and system for identifying and collecting electronic evidence data from a number of remote computing devices.

BACKGROUND OF THE INVENTION

Since computers have become a common part of most office environments, the collection of electronic data stored on computer systems has become a primary focus in litigation, regulatory and/or law enforcement evidence discovery. As litigants and regulatory agencies have increased their focus of evidence discovery on data stored in computer systems, the amount of resources applied to electronic evidence data collection has exponentially increased. Accordingly, the discovery process of identifying, locating, collecting and reviewing voluminous amounts of potentially relevant data in both client and opposing party systems has become an increasingly difficult task.

Currently known methods of electronic evidence data discovery involve a process where one or more individuals manually collect electronic evidence data directly from the computing devices storing the data. The known methods are difficult because the operators collecting the evidence data (the data collectors) typically have to be physically located at a computing device or a computer network having a central server storing the electronic evidence data. While such existing practices are generally effective in collecting small quantities of electronic evidence data from a small-scale computer system, there are several disadvantages. In particular, the manual process of collecting evidence data from a large number of computing devices in a sizeable company requires a vast amount of resources that often results in an inefficient, time consuming process. More specifically, the manual process requires the data collectors to commute to the location of the computing devices and transport supporting equipment necessary to facilitate the evidence data collection. In addition, the manual process of data collection creates other resource problems as the data collectors typically disrupt the users of the computing devices during the data collection process.

The above-described difficulties are exasperated by the fact that the manual process of electronic evidence data collection also requires a large assortment of computer equipment to facilitate the data collection. In large computer network systems, there may be a many different types of computing devices that require different types of data retrieval equipment, such as specific types of parallel-port tape drives, floptical drives, etc. Having this need for a wide variety of data capture equipment creates the possibility of hardware compatibility issues, and in some situations, the hardware compatibility issues may prevent one from collecting data from some computing devices. In addition, manual data collectors, being human, may overlook or misidentify potentially relevant data and/or may apply differing data identification and/or data capture standards, thereby resulting in an inconsistent and/or incomplete set of potentially relevant data.

In addition to the resource and efficiency issues described above, the known methods of electronic evidence data collection present many other logistical and security issues. For instance, data collectors also have the difficult task of managing computer network login information to access the various computers storing the electronic evidence data. This task often creates many barriers for the data collectors as login and password information is often changed or miscommunicated. In addition, the communication of such security information such as a user's login and password often compromises the security of the computer system storing the electronic evidence data.

Accordingly, from the foregoing, there is a need for a system and method for automatically locating, identifying, and collecting relevant electronic evidence data stored in a plurality of remote computers. In addition, there is a need for a method and system for providing an electronic evidence data collection system that does not disrupt a user of the computing device storing the electronic evidence data.

SUMMARY OF THE INVENTION

The present invention provides a system and method for automatically identifying and collecting evidence data stored in a plurality of computing devices. In one aspect of the present invention, an agent software application is provided. The agent software application is sized and configured to allow the agent software application to be sent to a plurality of networked computing devices for storage and execution.

When the agent software application is executed on a networked computing device, the agent software application identifies data files that are characteristic of particular electronic evidence being sought. In one embodiment, the agent software application identifies data files containing electronic evidence by the use of predefined search criteria stored in the agent software application. More specifically, one embodiment of the predefined search criteria provides instructions for the agent software application to identify data files characteristic of electronic evidence by searching for predetermined keywords in and/or relating to the data files. In other embodiments, the predefined search criteria can also be configured to instruct the agent software application to identify data files by analyzing system information related to a data file. For instance, the system information may include an attribute that indicates a time when the data file was created, last modified or accessed. In yet other embodiments, the predefined search criteria can also be configured to instruct the agent software application to identify data files by analyzing the file type or by analyzing the directory location in which the data files are stored.

Once the agent software application identifies the data files characteristic of electronic evidence, the identified data is transferred to a central computing system, such as a server, for storage. In one embodiment, the agent software application is configured to automatically transfer the identified data at a predetermined time, e.g., at 9:00 PM, to avoid peak network traffic times. In another embodiment, the agent software application is configured to transfer the identified data to the server in accordance with a predetermined time schedule to moderate the number of simultaneous file transfers running at the server. This embodiment also allows the agent software application to execute the data transfer at a time that is least likely to disrupt the user of the computer.

In accordance with another aspect of the present invention, one embodiment of a system comprises a networked computer environment having a plurality of remote computers, a collection server, and an analysis server. In this embodiment, the collection server and analysis server are configured to receive data from the computers. The collection server and analysis server may be constructed of one computing device or a plurality of computing devices.

In one mode of operation, the agent software application is transferred from a server, such as the analysis server, to the plurality of remote computers. The agent software application is then independently executed on each remote computer, where the agent software application then identifies data that is characteristic of electronic evidence. In accordance with the present invention, electronic evidence data can be any data that is related to any litigation, hearing, settlement negotiation, regulatory or law enforcement investigation, or other like matter. Electronic evidence can also be any computer data file that is the subject of any evidence discovery or any computer data file that is sought to be excluded from an evidence discovery procedure, such as a work product.

The system and method of the present invention also extracts relevant information from voluminous storage banks of electronic mail, computer applications and other electronic sources. The system and method is also configured to recover data that has been deleted, tampered with, damaged or hidden.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides a system and method for identifying and collecting electronic evidence data from a number of remote computing devices for storage on a centralized computing system. In accordance with the present invention, electronic evidence data can be any data that is related to any litigation, hearing, settlement negotiation, regulatory or law enforcement investigation, or any other like matter. Electronic evidence can also be any computer data file that is the subject of any evidence discovery or any computer data file that is sought to be excluded from an evidence discovery procedure, such as a work product.

In one embodiment, a data collection routine communicates selected electronic evidence data from a number of remote computing devices by the use of an agent software application. The agent software application searches for specific data files and coordinates a data transfer of the desired data files to the centralized computing system. The system and method of the present invention also provides a method for analyzing and sorting the data collected at the centralized computing system. One skilled in the relevant art will appreciate that the disclosed embodiments are illustrative in nature and should not be construed as limiting.

The following description first provides an overview of one suitable computing environment in which the invention can be implemented. The following description then provides a general overview of one computing device that may be used for executing the computer-readable code configured to carryout the methods of the present invention. Following the description of the computing environment and computing device, the following description provides an overview of an agent software application utilized in the operation of the system and method of the present invention. Lastly, the following description provides an illustrative example of one implementation of the data collection routine of the present invention.

Figure 1:
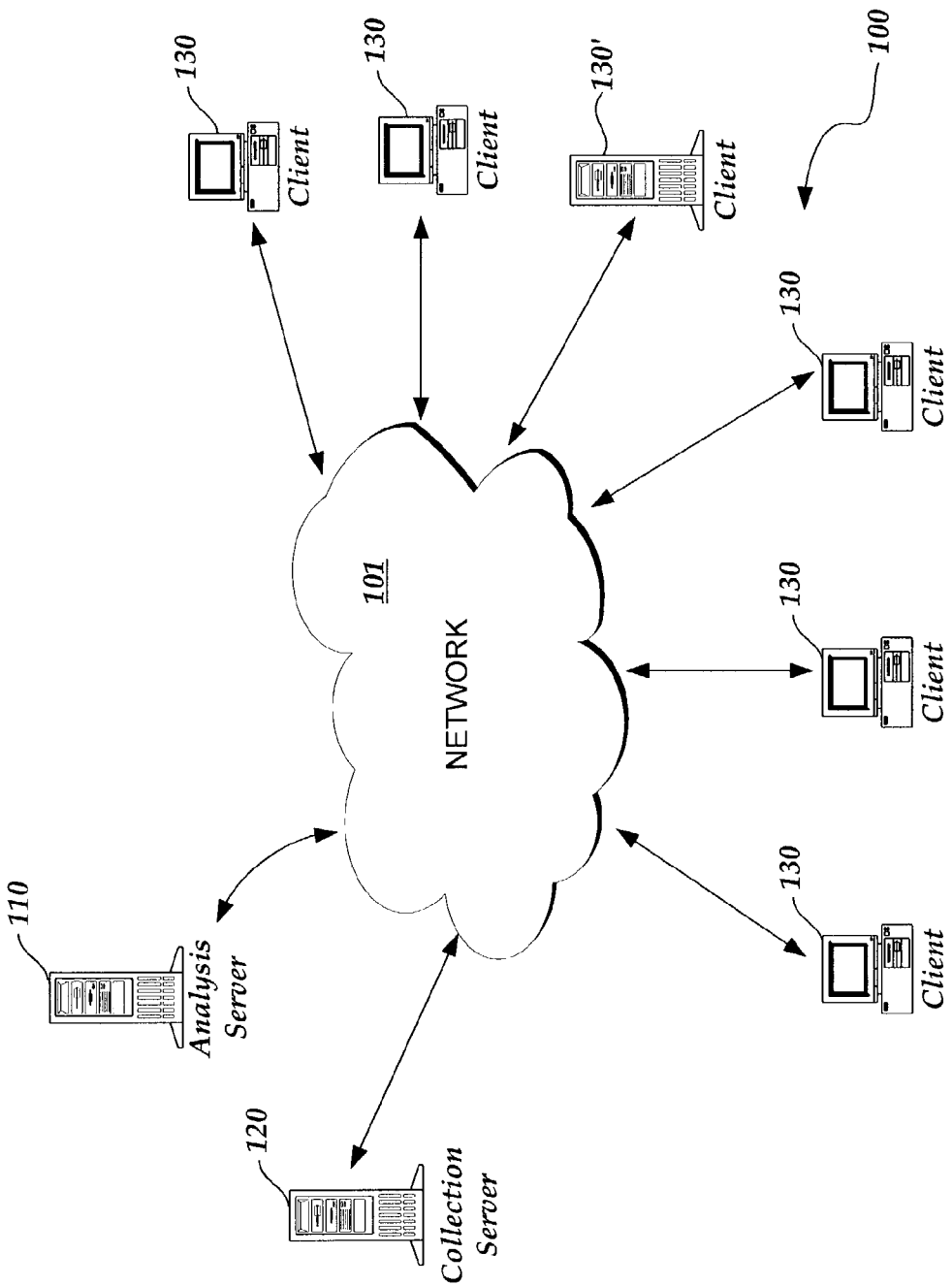
FIG. 1 is a block diagram of a computing environment in which one embodiment of the present invention may be implemented.

Referring now to FIG. 1, the following description is intended to provide an exemplary overview of one suitable computing environment 100 in which the invention may be implemented. Generally described, the computing environment 100 comprises a number of remote client computers 130, a collection server 120, and an analysis server 110. In accordance with one illustrative example of the present invention, the remote computers 130 represent a number of computers storing electronic evidence data. For example, the remote client computers 130 may be a group of computers owned by one business entity, or one division thereof, that is subject to an evidence discovery process. As described below, the remote client computers 130 may be in the form of any computing device, such as a server (130' of FIG. 1), standard desktop client computer 130, or any other networked computing device. Therefore, the remote client computer 130 will also be referred to as a computer 130 for purposes of illustrating one embodiment of the present invention. For illustrative purposes, the collection server 120 and analysis server 110 are representative central computing devices utilized for respectively collecting and analyzing the electronic evidence data.

Each computing device depicted in FIG. 1 is configured to electronically communicate via a network 101, such as the Internet. In addition, the analysis server 110 and the collection server 120 may be in a single computing device or a plurality of computing devices controlled by one business entity, and thus alternatively configured to electronically communicate via a Local Area Network ("LAN"). It should be appreciated that the illustrative embodiment shown in FIG. 1 is one suitable computing environment for the present invention and that methods described below may be implemented in any computing environment having networked computing systems. For instance, the computing environment 100 of FIG. 1 may be configured on an Intranet, thereby limiting the computing devices to a closed system.

As known to one of ordinary skill in the art, the term "Internet" refers to a collection of networks and routers that use the Internet protocol ("IP") to communicate with one another. As known to one having ordinary skill in the art, the Internet 101 generally comprises a plurality of LANs and Wide Area Networks ("WANs") that are interconnected by routers. Routers are special purpose computers used to interface one LAN or WAN to another. Communication links within the LANs may be twisted pair wire, or coaxial cable, while communications links between WANs may be optical links.

Figure 2:
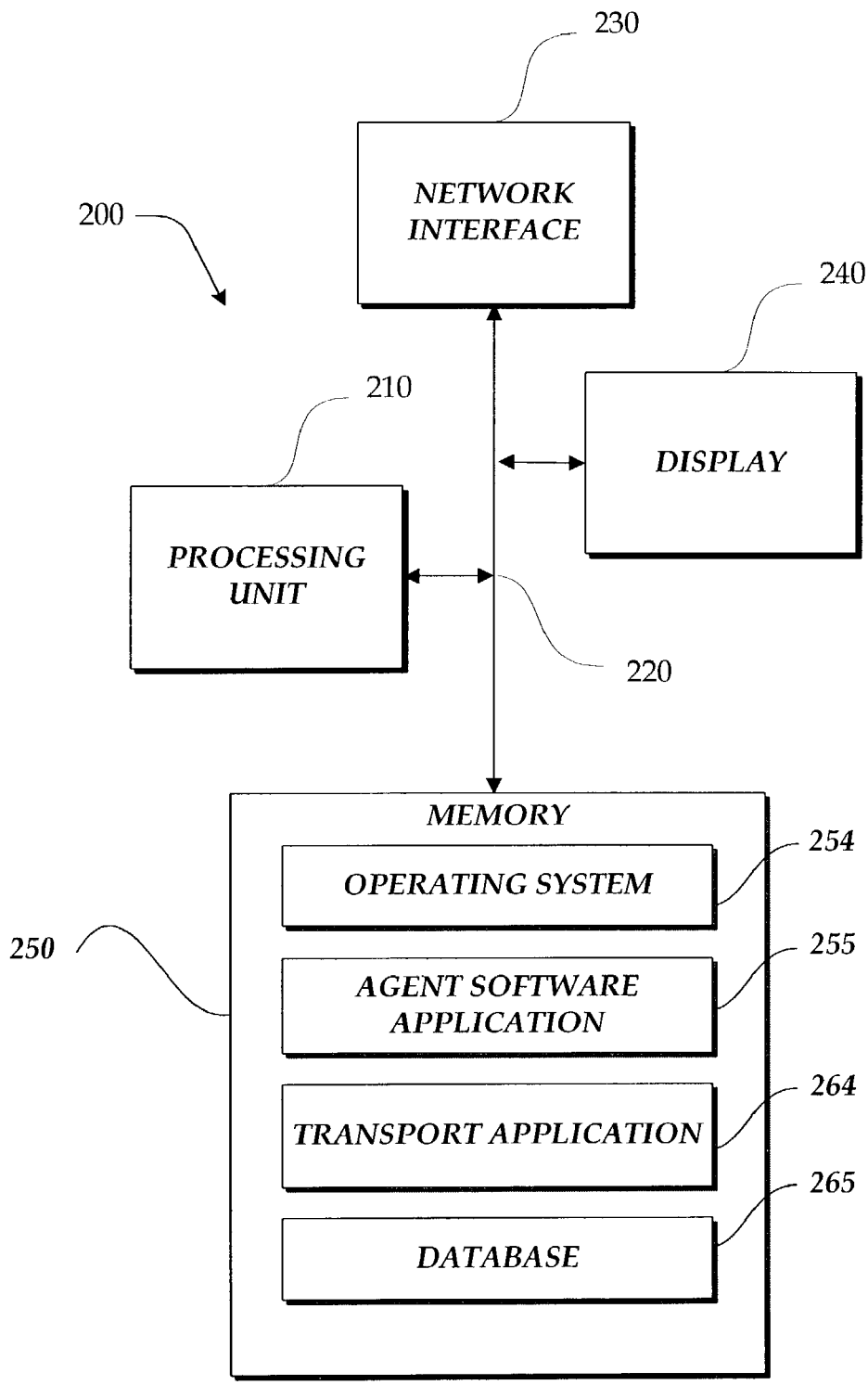
FIG. 2 is a block diagram depicting an illustrative architecture for a computing device utilizing an agent software application in accordance with the present invention.

Referring now to FIG. 2, an illustrative computing architecture for implementing one embodiment of the computing devices 110-130 of FIG. 1 will be described. Those of ordinary skill in the art will appreciate that the computing devices of FIG. 1 may include many more components than those shown in FIG. 2. However, it is not necessary that all of these generally conventional components be shown in order to disclose an illustrative embodiment for practicing the present invention.

As shown in FIG. 2, the computing devices utilized in the implementation of the present invention include a network interface 230 for electronic communication with a network, such as the network 101. Each computing device depicted in FIG. 1 also includes a processing unit 210, a display unit 240, and memory 250. The memory 250 generally comprises a random access memory ("RAM"), a read-only memory ("ROM"), and a permanent mass storage device, such as a hard drive. The memory 250 stores the program code necessary for operating the hardware components of the computing device, such as an operating system 251. In the configuration of the collection and analysis servers 120 and 110, the memory 250 stores other software applications such as a file transfer server application 260. The memory 250 of each computer 130 may store an agent software application 255. As described in more detail below with reference to FIG. 3, the agent software application 255 is configured to establish a data communication link with the file transfer server application 260.

To facilitate one implementation of the present invention, the collection server 120 is also configured with a database 265 for storage of the received electronic evidence data files. It can be readily appreciated that the software components 255-265 may be loaded from a computer-readable medium into the memory 250 using a drive mechanism associated with a computer-readable medium, such as a floppy, tape, CD-ROM, DVD, or any network interface.

Although each of the computing devices of FIG. 1 have been described as conventional general purpose computing devices, those of ordinary skill in the art will appreciate that the computing devices may be constructed from a number of alternative electronic devices, such as a server having a distributed disk drive configuration. In addition, the remote computers 130 may comprise of a two-way pager, a mobile phone, a personal data assistant ("PDA"), or the like.

Referring again to FIG. 1, a general description of the operation of the present invention will be described. In one aspect of the present invention, a data collection routine is provided. The data collection routine utilizes a number of individually configured agent software applications that are electronically transferred to the plurality of remote computers 130. The agent software application may be transferred from any one of the remote computers 130 or a server, such as the collection or analysis servers 120 or 110. The agent software application may be transferred to the plurality of remote computers 130 by the use of any known method. For instance, the agent software application may be transferred by the use of an attachment of an e-mail, a file transfer program, a computer-readable medium, or a file transfer initiated by a user selection of a hyperlink in a Web page.

As described in more detail below with reference to FIG. 3, the agent software application is configured to search each memory device of the remote computers 130 and generate a file index of all computer files stored on each memory device of the computer 130. Once generated, the file index is then transferred from each of the remote computers 130 to the collection server 120. Also described below, the agent software applications stored and executed on the remote computers 130 are configured to select and transfer specific files from each computer 130 to the collection server 120.

Once the collection server 120 has received a file index and selected computer files from each computer 130, the analysis server 110 then generates a report of the received files. In addition, the analysis server 110 analyzes the received files stored on the collection server 120 and verifies the receipt of specific files desired by a user. As known to one of ordinary skill in the art, the analysis server 110 and the collection server 120 may be combined into one computing device, or configured to operate on a plurality of computing devices.

Now that a general overview of the system of the present invention has been illustrated, specific aspects of the agent software application will now be described. The following section of the detailed description illustrates one method of implementing an agent software application that is configured into a relatively small executable program. The following example provides one illustration of an implemented agent software application and, thus, the scope of the present invention is not limited to software applications having this structure.

Generally described, the agent software application is configured to identify data files that are characteristic of electronic evidence. In one embodiment, the agent software application identifies data files containing electronic evidence by the use of predefined criteria stored in the agent software application. More specifically; one embodiment of the predefined criteria provides instructions for the agent software application to identify data files characteristic of electronic evidence by searching for predetermined keywords in the data files. In other embodiments, the predefined criteria can also be configured to instruct the agent software application to identify data files by analyzing a data file attribute that indicates a time when the data file was created, last modified or accessed. In yet other embodiments, the predefined criteria can also be configured to instruct the agent software application to identify data files by analyzing the file type or by analyzing the directory location in which the data files are stored.

Figure 3:
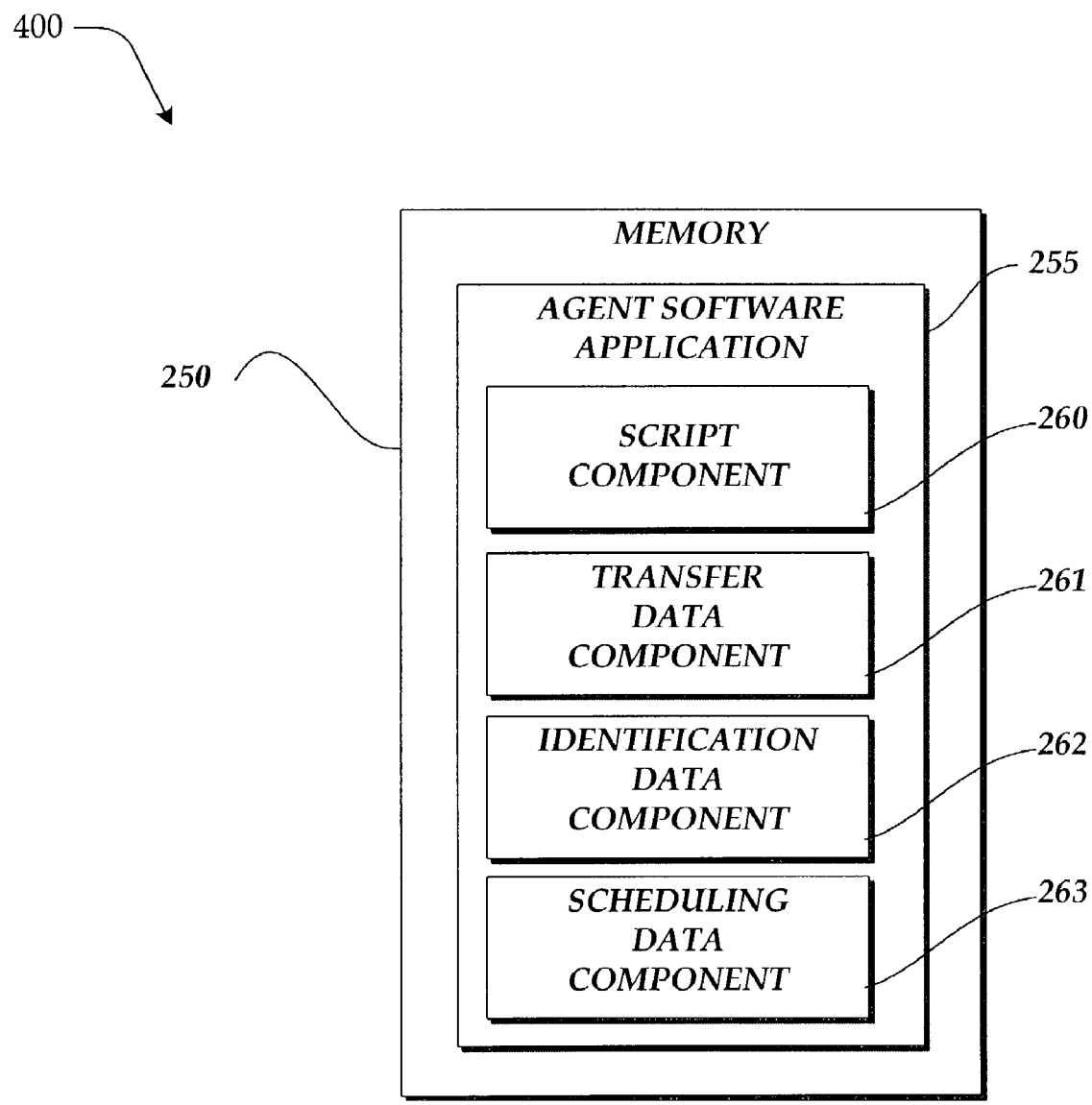
FIG. 3 is a block diagram of a representative section of a memory map of one remote computing device storing an agent software application in accordance with one embodiment of the present invention.

Referring now to FIG. 3, aspects of the agent software application will be described. FIG. 3 represents the memory map 250 of a computer 130 (FIG. 1) illustrating various components associated with the agent software application 255. In one illustrative example, the agent software application 255 includes configuration data, also referred to as the search criteria, utilized by the agent software application 255 to identify and select specific electronic evidence data. In one illustrative embodiment, there are four types of configuration data: template data 260, transfer destination data 261, identification data 262, and scheduling data 263. As described below, each component of the agent software application 255 may be stored in an executable software application file by the use of a generally known software application compiler. In one embodiment, the configuration data stored in each component 260-263 may be in the form of text meta tables such as those examples shown in Appendices A and B. In another embodiment, the search criteria may also be stored on a central source, such as an Internet Web site, where it may be referenced by the agent. This embodiment provides an easy way for the system to update the search criteria.

The template data component 260 provides information that instructs the agent software application 255 to collect general information describing various aspects of the computer 130. In one illustrative example, the template data 260 may instruct the agent software application 255 to read the user name of the person logged into the computer 130, the drive size, the drive configurations, e.g., the number of drives installed in the computer, and the amount of free space available in the computer's memory. In another illustrative example, the template data 260 may instruct the agent software application 255 to catalog all files stored in the hard drive of the computer 130. The template data 260 may also instruct the agent software application 255 to build a file catalog of specific types of files, e.g., Word documents, system files, etc. Similarly, the template data 260 may instruct the agent software application 255 to build a catalog of deleted files. This information stored in the template data 260 may be in the form of a meta table as shown in Appendix A. An illustrative example of Appendix A the "<inclusion template>" includes the text "*.doc" and "*.xl," which instructs the agent software application 255 to search for specific types of files. As known to one of ordinary skill in the art, any other type of filename extension may be included in this section of the template data 260 to search for other specific files.

Referring again to FIG. 3, the transfer data component 261 provides information that instructs the agent software application 255 to execute the file transfer between the computer 130 and the collection server 120. More specifically, the transfer data 261 determines the protocol of the network communication link established between the computer 130 to the collection server 120. In one illustrative example, the transfer data may instruct the computer 130 to transfer the file catalog and all transferable files to the collection server 120 via a file transfer protocol ("FTP"). In other embodiments, the transfer data may instruct the agent software application 255 to send the file catalog and the transferable files via an e-mail message or other like means of communication. The transfer data 260 includes the network address of the collection server 120 and other data attributes that indicate other data transfer parameters, such as a file transfer time-out period, the number of times the FTP connection should be attempted before failure, and other like information.

Referring again to FIG. 3, the identification data component 262 provides information that allows the agent software application 255 to access the secured data of the computer 130. In one illustrative example, the information data 262 may store the login information of one user of the computer 130. In addition, the identification data 262 may include the computer name assigned to the computer 130, one e-mail address of a user of the remote computer, and the name of one user of the computer 130. An example of one text format of the identification data 262 is shown in APPENDIX B. As shown in APPENDIX B, the identification data 262 may be configured to instruct the agent software application 255 to login as a user, e.g., John Jessen, and scan disk drives related to that user's login. Also shown in APPENDIX B, many other parameters may be utilized in the identification data 262 to collect data related to errors, such as drive scan and data transmission errors.

Referring again to FIG. 3, the scheduling data component 263 provides data attributes to instruct the agent software application 255 to execute and transmit data at a certain time. This configuration allows the agent software application 255 to execute a time that does not conflict with the user of the computer 130. In one embodiment, the scheduling data 263 may store a time of day that indicates when the agent software application 255 may execute. The scheduling data 263 may also store a time of day that indicates when the agent software application 255 may transfer the selected files from the computer 130 executing the agent to the collection server 120. In one embodiment, a plurality of agent software applications may be configured as a group to collect electronic evidence data from one particular company having a plurality of remote computers connected to a local area network. In this type of group configuration, each remote computer in the group may have individual settings in the agent software application 255 that coordinate the upload times. For example, the settings for each agent software application 255 may be configured so that there are no more than two or three individual data transfers occurring at one particular time. In this embodiment, all remote computers of the local area network are coordinated such that all file transfers from each remote computer are spread out through a period of time, thus avoiding an overflow of data transfers to the collection server 120.

Once executed, the agent software application 255 is configured to operate under a number of parameters that are established at the time the agent software application 255 is compiled. For instance, it is preferred that the agent software application 255 is configured such that it cannot be executed past a certain date. In this embodiment, the agent software application 255 analyzes the time and date stored in the remote computer processing device and deletes itself from the hard drive if the user tries to execute the program past a predetermined time and date. In another embodiment, the agent software application 255 is designed to only execute at one time. As known to one of ordinary skill in the art, when a software application executes on a remote computer, specific codes can be inserted into the executable code to disable the code from running a second time. In other implementations of this feature, specific data can be written to the registration of the operating system, thus indicating its use. In yet another embodiment of the present invention, the agent is configured to transmit an error message to the collection server 120 if the agent does not successfully execute. In this embodiment, the collection server 120 is also configured to implement redirection efforts in response to receiving the error message.

As known to one of ordinary skill in the art, the implementation of the above-described agent software application 255 features can be based on several software libraries from generally known software development libraries, such as those libraries found in worm or virus toolkits, MSDN libraries or other like computer code resources. As known to one of ordinary skill in the art, a generally known software application compiler may be used to build the executable code for carrying out the above-described software application features. In one embodiment, a compiler may be used to read and configure text files, such as those shown in appendices A and B. In addition, other security based software libraries maybe utilized in the implementation to encrypt and encode the various data components 260-263 into the agent software application 255.

Figure 4:
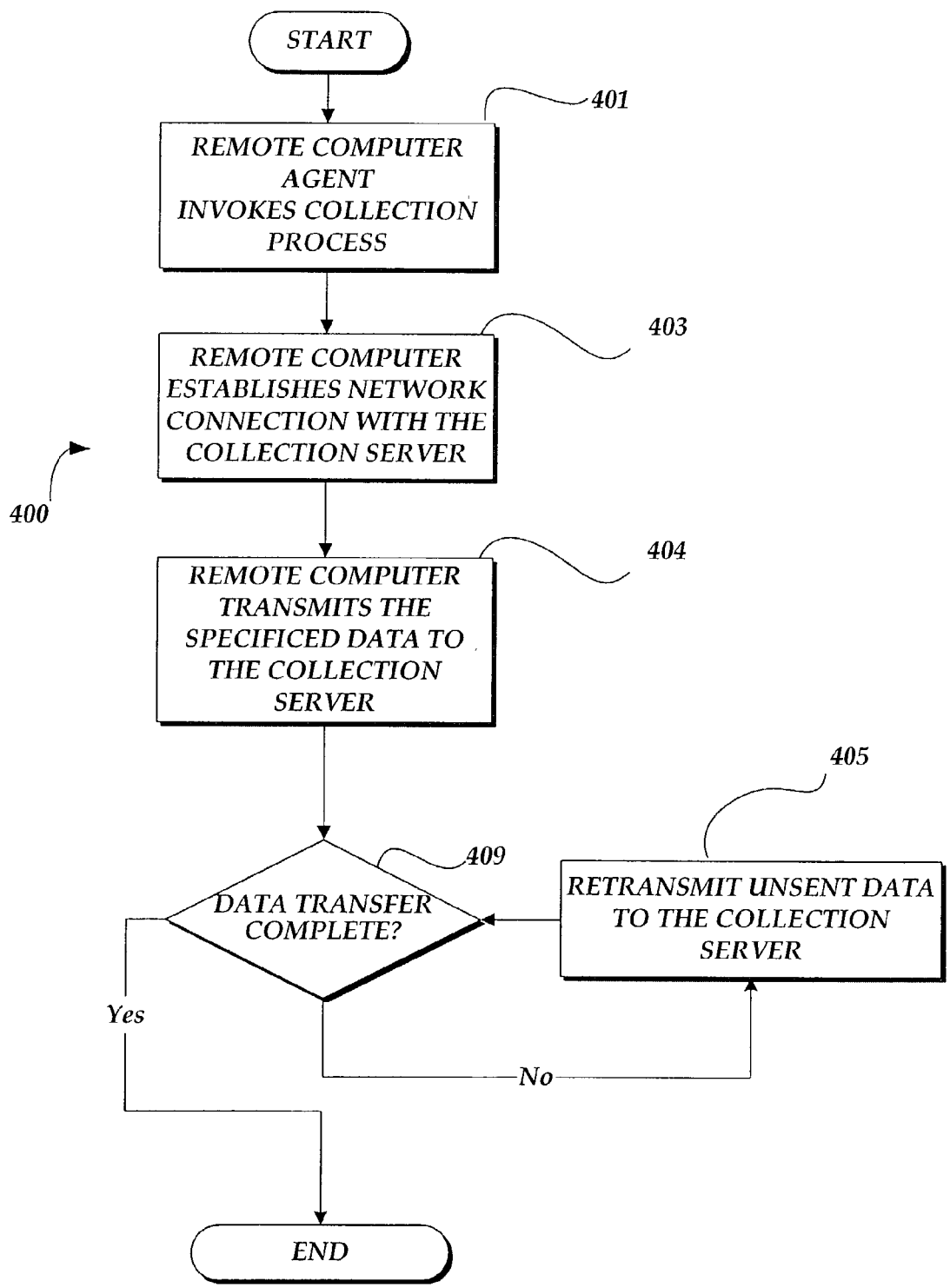
FIG. 4 is a process diagram of a method for identifying and collecting evidence data from a plurality of remote computers.

Referring now to FIG. 4, a flow diagram describing one implementation of the data collection routine 400, formed in accordance with the present invention will be described. The data collection routine 400 illustrated in FIG. 4 and described below provides an efficient means for identifying and collecting electronic evidence data from a number of remote computers. The method and system of the present invention allows for the collection and storage of electronic evidence data, and allows a computing device, such as the analysis server 110 of FIG. 1, to review, analyze and generate reports on the collected electronic evidence data.

The collection routine 400 begins at block 401, where the agent software application 255 searches the local memory device of the computer 130 for specific data. As described above with reference to FIG. 2, the agent software application 255 is configured to identify data related to the computer 130 such as the machine name, disk parameters, and other like machine data. The process of block 401 also includes the generation of a file catalog. The format of the file catalog may be in an encrypted text format that communicates the file names and the locations of each file stored on the hard drive of the computer 130. The catalog may also include a directory map of each folder and subfolder stored on the hard drive of the computer 130. As described above with reference to FIG. 3, the agent software application 255 refers to the template data component 260 to identify the data that is to be collected in the process of block 401.

The collection routine 400 then proceeds to block 403 where the remote computer establishes a network connection with the collection server 120. The network connection in the process of block 403 is in the form of any network protocol sufficient for transferring one or more data files between computing devices, such as an FTP connection. The protocol established and the network connection can be dictated by the meta-information stored in the transfer data component 261 stored in the agent software application 255.

After the computer 130 establishes the network connection with the collection server 120, the data collection routine 400 proceeds to block 404 where the computer 130 transmits the specified data to the collection server 120. In this data transmission, the file catalog generated in the process of block 401 is transmitted via a secure network connection. In addition to the transfer of the file catalog, the files designated in the template data 260 are transferred from the computer 130 to the collection server 120. In other embodiments, the computer 130 may communicate the specified data to the collection server 120 by the use of any other known means. For instance, the computer 130 may e-mail the specified data to the collection server 120. In another example, the computer 130 may store the specified data in a local file for manual collection by the use of a computer-readable medium, such as a floppy disk, CD-ROM, etc. This embodiment allows a user to conduct a manual collection process of the specified data in a more efficient and consistent manner.

In one embodiment, the schedule of the data transfer of the designated files is spread over a predetermined period of time. For instance, if the computer 130 is instructed to transmit 150 files to the collection server 120, the agent software application 255 may first schedule the data transfer of the first 30 files at 10:00 p.m. of one date, the next 50 files at 10:00 p.m. on a second date, etc.

The data collection routine 400 proceeds to decision block 409 where the agent software application 255 determines if the data transfer is complete. At decision block 409, if the agent software application 255 determines that the data transfer is complete, the data collection routine 400 terminates. However, at decision block 409, if the agent software application 255 determines that the data transfer is not complete, the data collection routine 400 proceeds to loop between blocks 409 and 405 where the agent software application 255 repeatedly attempts to transfer the electronic evidence data to the server. As described above, the transfer data 261 may contain information to limit the number of times the agent software application 255 attempts a retransmission of failed data. Accordingly, if the agent software application 255 attempts a retransmission up to a maximum number of transfers or if all data is transferred, the data collection routine 400 terminates.

By the use of the above-described invention, electronic evidence data is readily identified and collected by a central computing device. While illustrative embodiments of the invention have been illustrated and described, it will be appreciated that various changes can be made therein without departing from the spirit and scope of the invention.

APPENDIX A

```
<agent>
    <uniqueKey>FA7B-7821-00A0-2192</uniqueKey>
    <expirationDate>07/15/2001</expirationDate>
    <magicNumber>8872</magicNumber>
    <inclusionTemplate>*.doc; *.xl*; *.ppt; *.txt; *.md*;
            *.db*; *.ld*</inclusionTemplate>
    <exclusionTemplate>{windows}\system\*.*</exclusionTemplate>
    <initialRunDatetime>06/01/2001 01:00:00</initialRunDatetime>
    <maxRunTime>5:30:00</maxRunTime>
    <showStatus>No</showStatus>
    <transferFiles>Yes</transferFiles>
    <catalog>Yes</catalog>
    <systemInformation>Yes</systemInformation>
    <transferFilePrefix>{userName}_</transferPrefix>
</agent>
```

APPENPIX B

```
<client>
    <ID>125</ID>
    <name>Sample Company</Name>
    <user>
        <ID>1022101</ID>
        <emailAlias>employee@sc.com</emailAlias>
        <name>
            <last>employee</last>
            <first>sample</first>
        </name>
        <FTPHost>ftp.sc1.org</FTPHost>
        <scanNetworkDrives>Yes</scanNetworkDrives>
        <scanRemovableDrives>Yes</scanRemovableDrives>
        <sendNotification>Yes</sendNotification>
        <sendErrors>No</sendErrors>
    </user>
    <user>
        <ID>1022102</ID>
        <emailAlias>employee2@sc.com</emailAlias>
        <name>
            <last>employee2</last>
            <first>sample</first>
        </name>
        <FTPHost>ftp.sc2.org</FTPHost>
        <scanNetworkDrives>Yes</scanNetworkDrives>
        <scanRemovableDrives>Yes</scanRemovableDrives>
        <sendNotification>Yes</sendNotification>
        <sendErrors>No</sendErrors>
    </user>
</client>
```

The invention claimed is:

1. A method for collecting electronic evidence data from one or more computers, wherein the method comprises:
    providing an agent software application to the one or more computers, wherein the agent software application includes criteria to identify data that is characteristic of electronic evidence, said criteria comprising at least one predetermined keyword to search for in a data file, a data file attribute that indicates a time when the data file was accessed, a file type, and a directory location in which the data file is stored, wherein said electronic evidence data further concerns an operational aspect of the one or more computers on which the agent software application is executing, and wherein the agent software application is configured to transmit the identified electronic evidence data to a server;
    executing the agent software application on at least one computer, wherein the execution of the agent software application searches a local memory of the computer and identifies said electronic evidence data in said local memory;

transmitting the identified data from at least one computer executing the agent software application to the server;
receiving the identified data at the server, wherein the identified data is received from at least one computer executing the agent software application;
storing the identified data on a memory device of the server;
verifying a receipt of the identified data at the server; and
generating a report of the identified data.

2. The method of claim 1, wherein the criteria is further configured to identify data that is characteristic of electronic evidence by using a variable indicative of a time period in which data files containing the data were last modified.

3. The method of claim 1, wherein the criteria is further configured to identify data that is characteristic of electronic data by using a variable indicative of a time period in which data files containing the data were created.

4. The method of claim 1, wherein the identified data further includes a list of files stored on a memory device on at least one computer.

5. The method of claim 1, wherein the agent software application is provided to the one or more computers by transmitting the agent software application in an email sent from the server to the one or more computers.

6. The method of claim 1, wherein the agent software application is provided to the one or more computers by transmitting the agent software application from the server to the one or more computers by using a file transfer protocol.

7. The method of claim 1, wherein the agent software application is configured to automatically execute at a first time, and wherein the agent software application is configured to transmit the identified data at a second time.

8. The method of claim 1, wherein the agent software application is configured to transmit the identified data by:
    transmitting the identified data from at least one computer to the server;
    determining if the transmission of the identified data has failed;
    if the transmission of the identified data has failed, terminating the transmission of the identified data; and
    retransmitting the identified data from at least one computer to the server on a predetermined schedule.

9. The method of claim 1, wherein the electronic evidence data comprises a machine name and disk parameters of the computer on which the agent software application is executing, as well as a user name of a person logged into the computer, a drive size, drive configurations, a catalog of files stored in a computer memory, and an amount of free space available in the computer's memory.

10. A computer-readable medium containing computer-readable instructions which, when executed by a computer, perform the method of claim 1.

11. A method for collecting electronic evidence data from a computer, wherein the method comprises:
    obtaining an agent software application, wherein the agent software application includes predefined criteria to identify data that is characteristic of electronic evidence, said criteria comprising at least one predetermined keyword to search for in a data file, a data file attribute that indicates a time when the data file was accessed, a file type, and a directory location in which the data file is stored, wherein the agent software application is configured to transmit the identified data to a server;
    executing the agent software application to identify said data that is characteristic of electronic evidence;
    transmitting the identified data from the computer to the server;
    verifying a receipt of the identified data at the server; and
    generating a report of the identified data,
    wherein the agent software application is configured to transmit the identified data over a period of time such that at least a first portion of the identified data is transmitted at a first time, and a second portion of the identified data is transmitted at a second time.

12. The method of claim 11, wherein the predefined criteria is configured to identify data that is characteristic of electronic evidence by using a variable indicative of a time period in which data files containing the data were last modified.

13. The method of claim 11, wherein the predefined criteria is configured to identify data that is characteristic of electronic evidence by using a variable indicative of a time period in which data files containing the data were created.

14. The method of claim 11, wherein the data includes a list of files stored on a memory device on at least one computer of the plurality of computers.

15. The method of claim 11, wherein the agent software application is provided to the plurality of computers by transmitting the agent software application in an email sent from the server to a plurality of computers.

16. The method of claim 11, wherein the agent software application is provided to a plurality of computers by transmitting the agent software application from the server to the plurality of computers by using a file transfer protocol.

17. The method of claim 11, wherein the agent software application is configured to transmit the identified data by:
    determining if the transmission of the identified data has failed;
    if the transmission of the identified data has failed, terminating the transmission of the identified data; and
    retransmitting the identified data from the computer to the server.

18. A computer-readable medium containing computer-readable instructions which, when executed by a computer, perform the method of claim 11.

19. A computer system for collecting electronic evidence on a server from a plurality of computers, wherein the computer system comprises:
    means for providing an agent software application to the plurality of computers, wherein the agent software application is configured with predefined criteria to identify data that is characteristic of electronic evidence, said criteria comprising at least one predetermined keyword to search for in a data file, a data file attribute that indicates a time when the data file was accessed, a file type, and a directory location in which the data file is stored, wherein said electronic evidence data further concerns an operational aspect of the computer on which the agent software application is executing, and wherein the agent software application is configured to transmit the identified data to the server;
    means for executing the agent software application on at least one computer of the plurality of computers to search a local memory of the computer and identify said electronic evidence data in said local memory;
    means for receiving the identified data at the server, wherein the identified data is received from at least one computer of the plurality of computers;
    means for storing the identified data on a memory device of the server;

means for verifying a receipt of the identified data at the server; and means for generating a report of the identified data.

20. A computer system for collecting electronic evidence on a server from a computer, wherein the computer system comprises:
- means for receiving an agent software application, wherein the agent software application is configured with predefined criteria to identify data that is characteristic of electronic evidence, said criteria comprising at least one predetermined keyword to search for in a data file, a data file attribute that indicates a time when the data file was accessed, a file type, and a directory location in which the data file is stored, wherein the agent software application is configured to transmit the identified data to the server;
- means for executing the agent software application, wherein the agent software application is configured to automatically execute at a first time;
- means for transmitting the identified data from the computer to the server, wherein the agent software application is configured to transmit the identified data at a second time;
- means for determining if the transmission of the identified data has failed, and if the transmission of the identified data has failed, then terminating the transmission of the identified data and retransmitting the identified data from the computer to the server; and
- means for storing the identified data on a computer-readable medium in the computer on which the agent software application is executing for manual collection at a later time.

21. A computer-readable medium having computer-executable components for collecting electronic evidence data, wherein the components comprise:
- a template data component operable to define a criterion that instructs a software application to identify and collect information describing operational aspects of a computer executing the software application, said operational aspects comprising a user name, drive size, a number of drives installed on the computer, amount of free space in a computer memory, and a catalog of files stored in the computer memory;
- an identification data component operable to define a criterion that instructs a software application to access secured data stored in the computer executing the software application based on the operational aspects of the computer, said secured data comprising a computer name, a user email address, and a user name; and
- a transfer data component operable to define a criterion that instructs a software application to transmit the secured data stored in the computer and the data that is identified in the template component.

22. The computer-readable medium of claim 21, further comprising a scheduling data component operable to define a criterion that instructs a software application to transfer the secured data stored in the computer and the data that is identified in the template component in accordance with a predetermined time schedule.

23. A computer system comprising a plurality of computers and a collection server, wherein the computer system is configured for collecting electronic evidence data from the plurality of computers and storing the electronic evidence data on the collection server, the system comprises:
- means for generating an agent software application, wherein the agent software application is configured with predefined criteria to identify data describing operational aspects of the computer on which the agent software application is executing, said operational aspects comprising a user name, drive size, a number of drives installed on the computer, amount of free space in a computer memory, and a catalog of files stored in the computer memory, wherein the agent software application is configured to transmit the identified data to the collection server as electronic evidence data;
- means for transmitting the agent software application to the plurality of computers;
- means for executing the agent software application, wherein the execution of the agent software application produces identified data that is characteristic of electronic evidence; and
- means for transmitting the identified data from the plurality of computers to the collection server.

24. A method for collecting electronic evidence data from a computer, wherein the method comprises:
- obtaining an agent software application, wherein the agent software application includes predefined criteria to identify data that is characteristic of electronic evidence, said criteria comprising at least one predetermined keyword to search for in a data file, a data file attribute that indicates a time when the data file was accessed, a file type, and a directory location in which the data file is stored, wherein the agent software application is configured to transmit the identified data to a server;
- executing the agent software application;
- storing the identified data on a computer-readable medium local to the computer on which the agent software application is executing;
- transmitting the identified data from the computer to the server; and
- if the transmission of the identified data is incomplete, then repeatedly attempting to transmit the electronic evidence data to the server until the data transmission is complete or a determined number of transmissions of the identified data has been attempted.

* * * * *